United States Patent [19]

Frye

[11] Patent Number: 5,121,896
[45] Date of Patent: Jun. 16, 1992

[54] SELF SECURING DEVICE

[76] Inventor: Bruce J. Frye, P.O. Box 483, Milltown, Wis. 54858

[21] Appl. No.: 645,808

[22] Filed: Jan. 25, 1991

[51] Int. Cl.$^5$ .............................................. A47F 5/00
[52] U.S. Cl. .................. 248/467; 248/205.3; 248/205.5
[58] Field of Search .................. 248/467, 205.3, 205.4, 248/205.1, 205.5

[56] References Cited

U.S. PATENT DOCUMENTS

| | | | |
|---|---|---|---|
| 3,098,272 | 7/1963 | Frye | 24/67 |
| 3,241,795 | 5/1966 | Frye | 248/28 |
| 3,311,339 | 3/1967 | Frye | 248/205.3 |
| 3,856,249 | 12/1974 | Frye | 248/205 |
| 3,885,768 | 5/1975 | Frye | 248/467 |
| 3,976,274 | 8/1976 | Langguth | 248/205.4 X |
| 4,003,538 | 1/1977 | Frye | 248/467 |
| 4,310,137 | 1/1982 | Frye | 248/467 |
| 4,421,288 | 12/1983 | Blaszkowski | 248/205.4 |
| 4,756,498 | 7/1988 | Frye | 248/205 |

FOREIGN PATENT DOCUMENTS

| | | | |
|---|---|---|---|
| 3542910 | 6/1987 | Fed. Rep. of Germany | 248/205.3 |
| 913107 | 12/1962 | United Kingdom | 248/205.3 |

Primary Examiner—David L. Talbott
Attorney, Agent, or Firm—Leo Gregory

[57] ABSTRACT

A reusable self securing plastic holding device for mounting onto a clean smooth surface and having a particular structure which contributes substantial load bearing capacity in being particularly adapted to resist shear force or peel back.

9 Claims, 3 Drawing Sheets

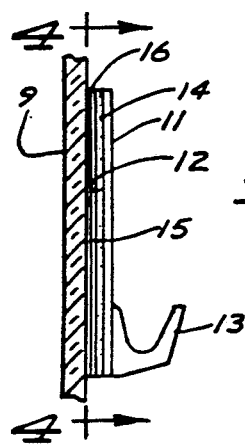
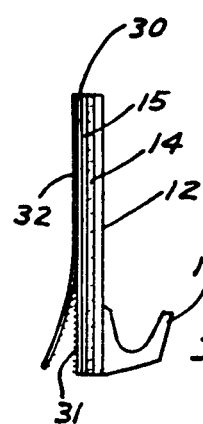
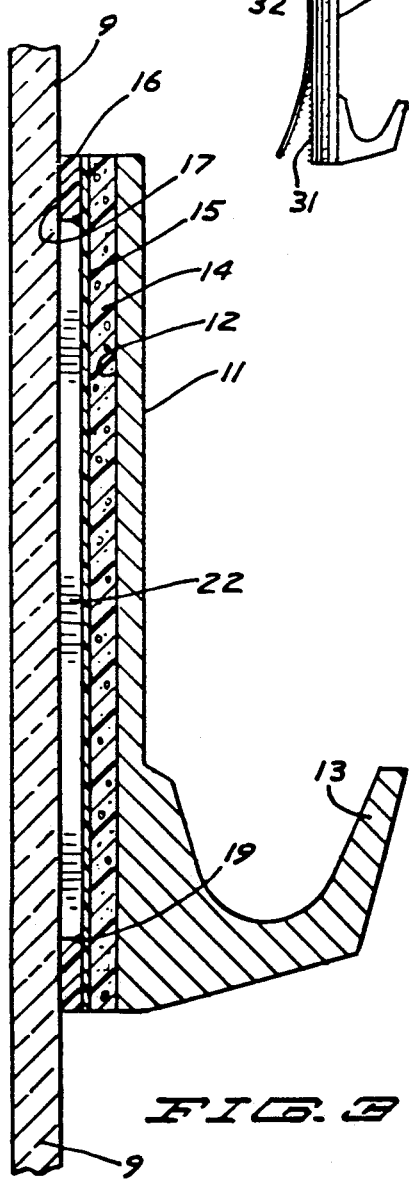
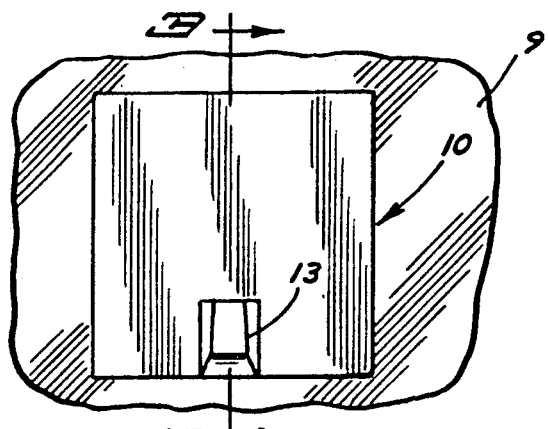
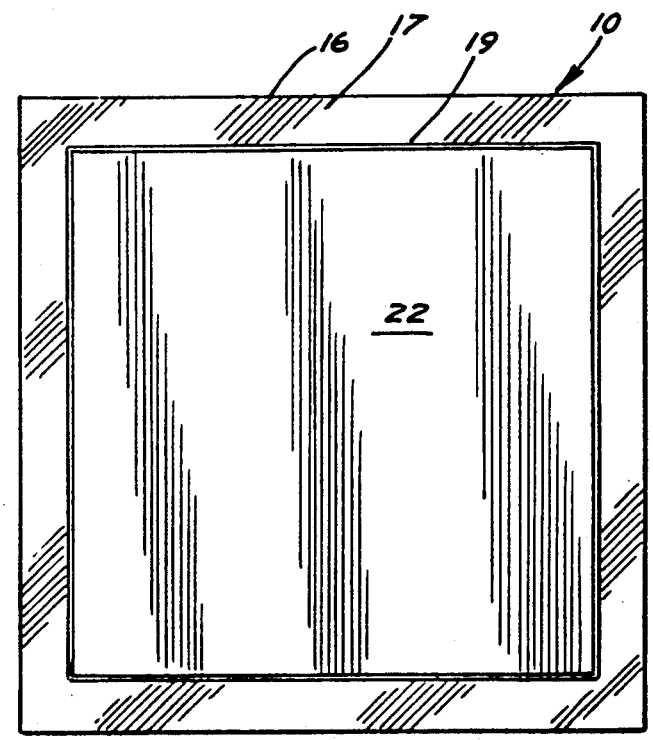

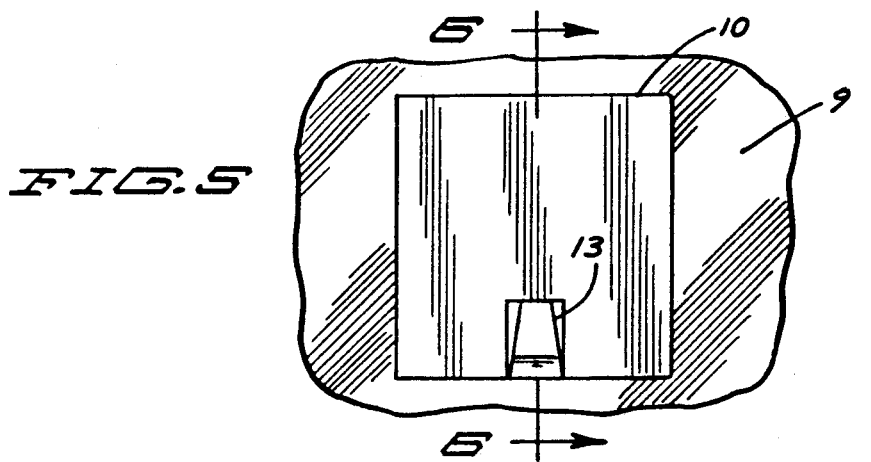
FIG. 5
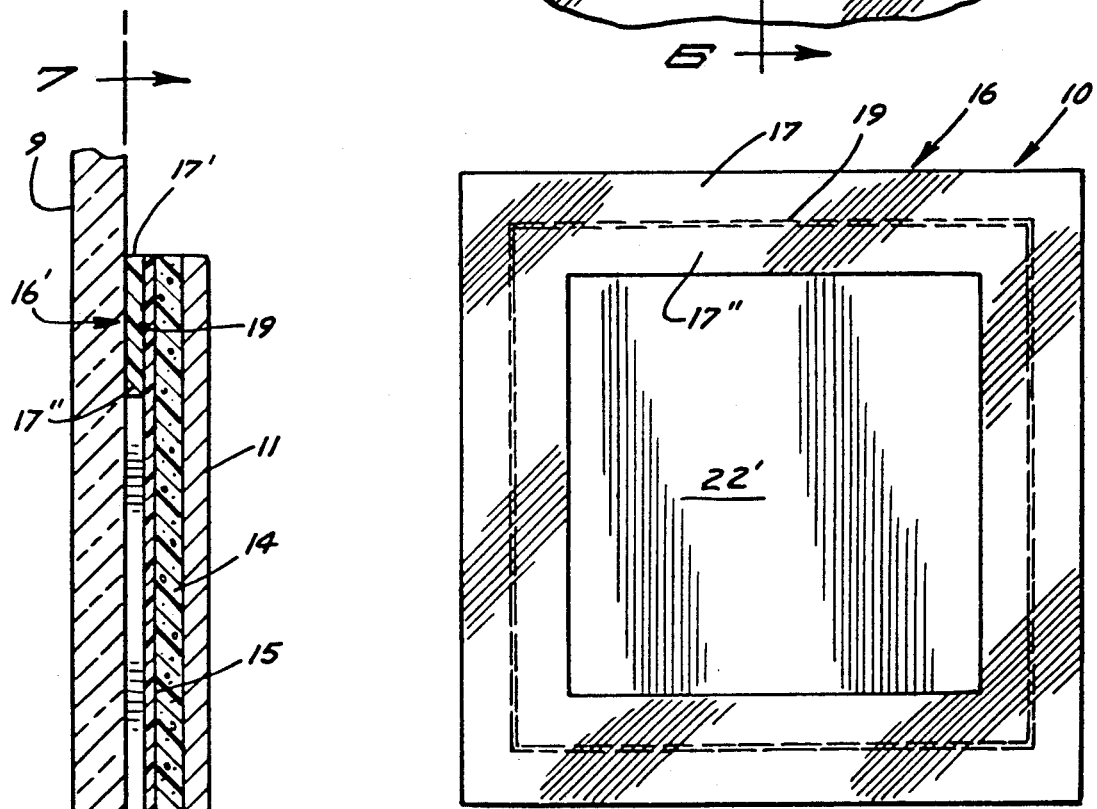
FIG. 6
FIG. 7

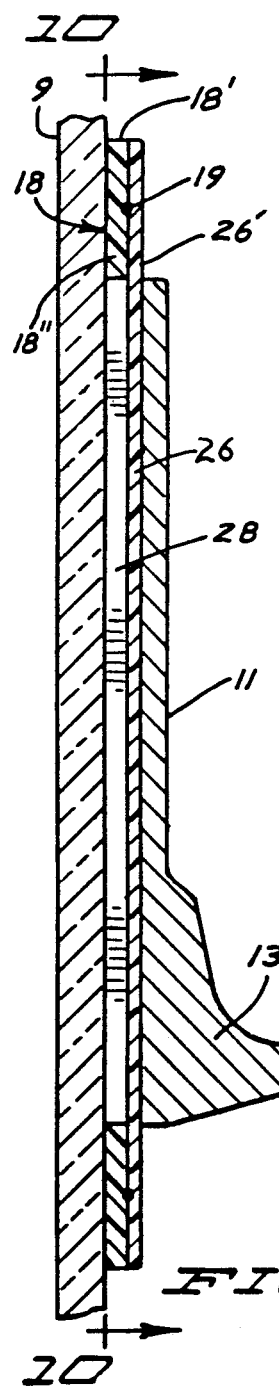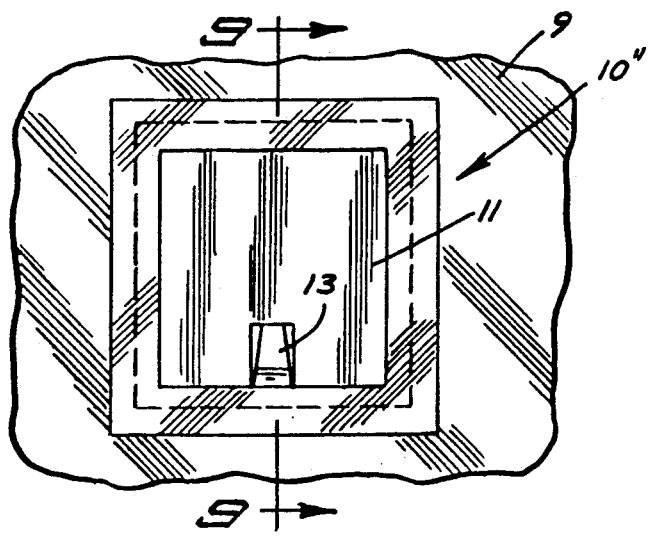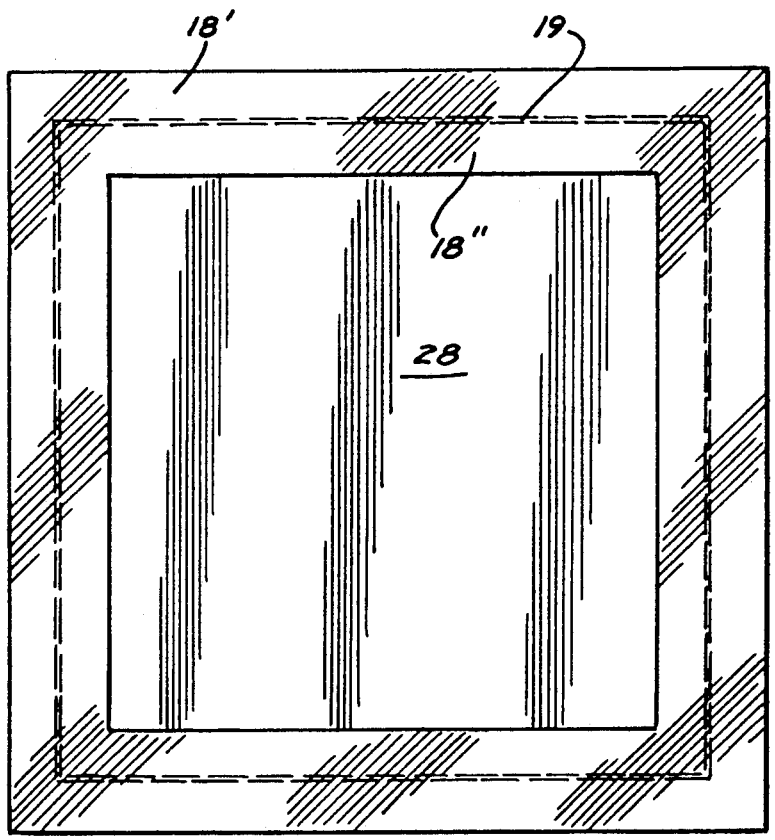

SELF SECURING DEVICE

BACKGROUND OF THE INVENTION

1. Field Of Invention

This invention relates to an enhanced holding capacity of a plastic holding device which is self securing and reusable.

2. Brief Description Of The Prior Art

There are many holding devices particularly for mounting signs of various kinds as on windows and elsewhere on smooth surfaces.

Early in the development of self holding mounts or holding devices, the inventor herein developed devices which relied for holding capacity on what has been referred to as molecular adhesion of which examples are his disclosures in the U.S. Pat. Nos. 3,098,272, 2,241,795 and 3,311,339, all issued to himself.

It is desirable to improve upon the art as known by developing a self securing device which has a very substantial increase in self holding capacity over what has been experienced in the prior art in addition to being reusable with no loss in holding capacity.

SUMMARY OF THE INVENTION

It is a principal object herein to develop a self securing holding device which resulting from a change in structure represents a very significant improvement in holding capacity over the previous makeup of such types of holding devices.

It is a further object herein to provide a self securing surface mounting holding device which upon being removed, may be reusable.

It is a still further object herein to design the mounting surface portion of a holding device wherein the focus of the pull of the object held is remote from the edges of the holding surface which results in great resistance to shear forces and very greatly enhances the holding capacity of the device.

It is a more particular object herein to provide a self holding device adapted to have significant resistance to shear force or peel back which greatly enchances the holding capacity of the device.

These and other objects and advantages of the invention will be set forth in the following description made in connection with the accompanying drawings in which like reference characters refer to similar parts throughout the several views.

BRIEF DESCRIPTION OF THE DRAWINGS

FIG. 1 is a top plan view of the device herein;
FIG. 2 is a view in side elevation;
FIG. 2a is a view in side elevation showing a modification of the structure of FIG. 2;
FIG. 3 is an enlarged view in vertical section taken on line 3—3 of FIG. 1 as indicated;
FIG. 4 is a bottom plan view on an enlarged scale;
FIG. 5 is a top plan view of a modification;
FIG. 6 is a view in vertical section on an enlarged scale taken on line 6—6 of FIG. 5 as indicated;
FIG. 7 is a bottom plan view on an enlarged scale;
FIG. 8 is a top plan view of another modification;
FIG. 9 is a view in vertical section taken on line 9—9 of FIG. 8 as indicated; and
FIG. 10 is a bottom plan view on an enlarged scale.

DESCRIPTION OF A PREFERRED EMBODIMENT

Referring to FIGS. 1-4 except for FIG. 2a, a holding device 10 is here shown comprising a base portion 11 in the embodiment here illustrated, and projecting from its upper surface there is here shown a hook 13 for the attachment of items to be held and said hook is merely an example and the same may be otherwise formed.

Secured to the underside 12 of said device and extending to the edge or perimeter thereof is a compressible layer 14 of material such as of a foam plastic composition. Overlying and attached to said compressible layer by a suitable adhesive and being coextensive therewith is a thin firm plastic layer 15.

Next, a peripheral bottom or perimeter layer 16 in the form of a strip overlies said firm layer 15. The form and substance of this bottom layer is very important. It has been found that a suitable material to use is a PVC (poly-vinyl chloride) material having a durometer on the order of a 65 count. This provides a very flexible naturally self securing or self adhering material.

Now will be described the structure which enhances the natural holding capacity of said PVC layer.

Said base portion 11 as here shown is rectangular in plan. It is to be understood that it can take on other forms such as being round, octagonal or triangular and it may have a convoluted edge.

The bottom layer 16 is an endless rectangular strip overlying the underside edge portion of said base and is of no particular critical width. Said bottom layer is secured to said adjacent layer 15 by a weld 19 formed along the inner edge portion thereof. Said weld is preferably very narrow and small in cross section and is suitably formed as a laser weld. A center area or pocket 22 is thus formed within the confines of said bottom layer or edge strip 16.

Thus the weld 19 in being located on the inner edge of the perimeter or edge strip leaves a relatively wide marginal rim portion 17 outwardly thereof.

Said device 10 is designed to be self secured to a smooth non-porous supporting surface such as of glass or polished metal which is here indicated by the reference numeral 9.

In use, the weight of any object held by said device will focus its pull or exertion upon the weld and the pull of the object held will radiate outwardly therefrom through the marginal portion 17 of the layer or strip 16.

When the device is positioned to be in a holding position, firm pressure is applied to the device against a supporting surface. The compressible layer 14 aids in more uniformly than otherwise distributing the pressure applied to the device throughout said marginal portion 17.

It should be borne in mind that the layer 16 has the property of molecular adhesion to secure the device. However the load upon the device or object held by it will tend to draw the central portion or pocket portion 22 outwardly of the supporting surface thus enlarging the pocket space and reducing the pressure of air therein to less than atmospheric air pressure. The direct pull is upon the weld and remote from the outer edges of said strip or layer and the natural securing power of the strip thus greatly resists peel back or shear force and provides an excellent air seal and an unbelievable holding capacity is achieved. The holding capacity is believed to be a combination of molecular adhesion and the vacuum in the pocket 22 caused by a lowered air pressure therein. In experimenting with a three inch square base, it was found to be next to impossible to pull the device free by hand from a supporting surface. However if an edge of the layer 16 were loosened the slightest amount from the supporting surface, the holding capacity was released at once. There are a combination of forces combined to provide this great holding capacity and although they may not be fully understood, there is no question of the astounding result. The fact that the pull upon the layer 16 is remote from its edges permitting a perfect seal at the edges contributes greatly to the holding capacity.

MODIFICATION

Referring to FIGS. 5-7, a modification is shown in which like reference numerals indicate parts identical with those above described and the only change in structure of the device herein, now indicated as 10', is present in the underlying layer 16 which in its modified form is indicated as 16'.

As shown, the strip 16' has more width than the strip 16 and is secured by the weld 19 along a medial line as illustrated providing an outer marginal portion 17' outwardly of said weld and an inner marginal portion 17" inwardly of said weld. Thus the pocket 22' within the confines of the inner marginal portion is of lesser extent than said pocket 22.

The exertion of any load placed upon the device is focused upon the weld 19 and thus is remote from the outer edges or perimeters of the inner and outer marginal portions.

The device is positioned for holding purposes as above described with pressure being applied to it against the supporting surface 9 pressing said marginal portions firmly against said supporting surface with the compressible layer spreading the pressure uniformily. The molecular holding capacity of the marginal portions excluding any air from entering thereunder and said vacuum in said pocket as above described combine to provide a tremendous holding capacity.

MODIFICATION

In FIGS. 8-10, another modification is shown in which the device herein is indicated as 10" and in which the base or base portion 11 and its hook 13 are as above described.

Unlike the embodiments above described, in this embodiment the base is not shown to have an underlying compressible layer as will be further described.

Secured directly to said base in a conventional manner and extending outwardly thereof thereabout is a thin firm layer of a plastic material 26, the outward portion thereof is indicated at 26'.

Underlying the perimeter portion 26' of said layer 26 is an endless strip layer or poly-vinyl chloride (PVC) 18 of the type above described and it extends across the width thereof between the outer edge of said base and across to the outer edge of said layer 26.

Said PVC strip is secured to its overlying layer 26 by a very thin laser weld 19 extending medially thereof thereunder. Thus at the outer side of said weld is a marginal portion 18' of said PVC strip and at the inner side of said weld is an inner marginal portion 18". Said marginal portions will adhere by molecular adhesion to a non-porous smooth surface but is free from adherence with its overlying plastic layer 26 to which it is attached by weld 19.

A pocket 28 is formed within the boundary of the inner marginal portion 18" of the strip 18. The depth of said pocket is the thickness of said strip 18.

In positioning said device 10" for holding purposes, the device and strip 18 are placed flat against a supporting surface and pressure is applied against the PVC strip forcing it down firmly to have a tight engagement with the underlying supporting surface. It is important that the mating of the surface of the PVC strip and the underlying surface be clean and free from any particles therebetween.

Thus there is present a very strongly held self holding self securing device, the holding capacity of which results from the molecular adhesion of said PVC strip. With the pull upon said device, by the weight of the object held thereby, being upon the weld and remote from the inner and outer edges of said strip 18, there is very little pull directly upon the edges, if any, and thus said edges seal out any air from leaking in thereunder.

FURTHER MODIFICATION

Referring now to the structure of FIG. 2a, this structure is the same as that of FIG. 2 with the exception that the fairly soft PVC layer 16 of FIG. 2 is here indicated by the reference numeral 30. Layer 30 need not be naturally self securing such as the layer 16 as it is indicated as being impregnated with or coated with a suitable adhesive 31 of a kind which may be reusable. The same is shown protected before use with a cover strip 32.

The holding capacity of the applied adhesive is greatly increased by the particular structure disclosed herein of the weld 19 about the inner edge of the layer or layer strip 30 which causes the pull of a load upon the layer 30 to be remote from its outer edges which combined with the vacuum within the pocket 22 provides a unique and novel holding structure in the development of this art.

It will be understood that the use of a layer such as layer 30 is also applicable to the structures of FIGS. 5-7 and 8-10.

With regard to the structure and its several modifications as above described, it has been noted that the holding capacity increases substantially as the relative sizes of the pockets 22, 22' and 28 increase. This is believed to be due to the resulting related increase in the vacuum holding effects of the pockets. Said pockets as here illustrated preferably are on the order of 40% to 50% the size of the underlying or surface engaging layers 16, 16' and 18. The relative sizes determine the marginal portions.

Thus described is a structure which provides very great holding capacity but it is not certain that all of the holding force is understood. What is important however is not the lack of total understanding of which is taking place but rather the result which is achieved.

It will of course be understood that various changes may be made in form, details, arrangement and proportions of the apparatus without departing from the scope of the invention, which generally stated consists of an apparatus capable of carrying out the objects above set forth, in the parts and combination of parts as disclosed and defined in the appended claims.

What is claimed is:

1. A self securing article holding device, having in combination a base portion, a thin firm plastic layer underlying and being secured to said base portion, a layer of fairly soft self securing plastic material formed as an endless strip underlying the edge portion of said firm plastic layer, a thin weld at the inner edge of said self securing plastic material securing the same to said firm plastic layer, said self securing layer forming a pocket centrally thereof defined by its inner edge, said self securing layer forming an outer marginal portion outwardly of said weld, whereby pressure upon said marginal portion to place it in tight engagement against a supporting surface secures said device to said supporting surface.

2. The structure of claim 1, wherein
a compressible layer disposed between said base portion and said firm plastic layer, and
means securing said compressible layer to said base portion and firm plastic layer.

3. The structure of claim 1, wherein
said base portion includes an article holding means.

4. The structure of claim 1, wherein
said fairly soft self securing layer has on the order of a 65 durometer.

5. The structure of claim 1, wherein
a pull up said device in secured position enlarges said pocket formed therein reducing the air pressure in said pocket to be less than atmospheric pressure resulting in a vacuum.

6. A self securing article holding device, having in combination
a base portion,
a compressible layer underlying said base portion,
means securing said compressible layer to said base portion,
a thin firm layer underlying said compressible layer,
means securing said firm layer to said compressible layer,
an endless strip layer of self securing plastic material underlying the edge portion of said thin firm layer,
said endless strip layer forming a pocket in its central portion defined by the inner edges thereof,
a thin weld securing said strip layer along said inner edges thereof to said firm layer,
whereby pressure upon said device against a supporting surface causing a firm engagement of said strip layer therewith secures said device to said supporting surface.

7. The structure of claim 6, wherein
said weld secures said strip layer to said firm layer along a line intermediate the width of said strip layer forming marginal portions of said strip layer inwardly and outwardly of said weld.

8. A self securing article holding device, having in combination
a base portion,
a thin firm layer underlying said base portion and extending outwardly thereof thereabout,
means securing said firm layer to said base portion,
an endless strip layer of self securing plastic material underlying the portion of said firm layer outwardly of said base portion,
a thin weld securing said strip layer to said firm layer,
said weld being intermediate the width of said strip layer,
said strip layer having a marginal portion outwardly of said weld and a marginal portion inwardly of said weld about said base portion,
said inward marginal portion defining a central pocket,
whereby pressure upon said marginal portions of said strip layer causing a firm engagement thereof with an underlying supporting surface secures said device.

9. The structure of claim 1, wherein
said fairly soft plastic layer having a reusable adhesive applied thereto.

* * * * *